March 15, 1960
L. F. McBRIDE
2,928,357
PIPE-TREATING APPARATUS
Filed Nov. 14, 1955
2 Sheets-Sheet 1
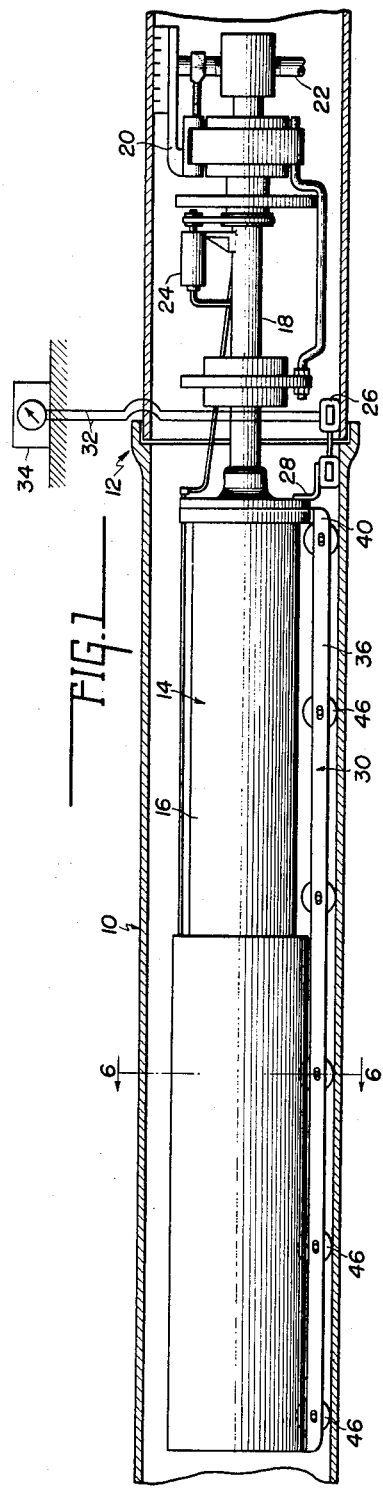
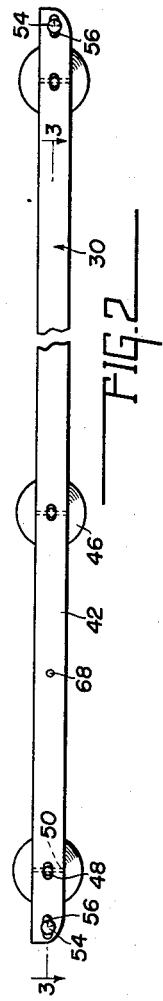
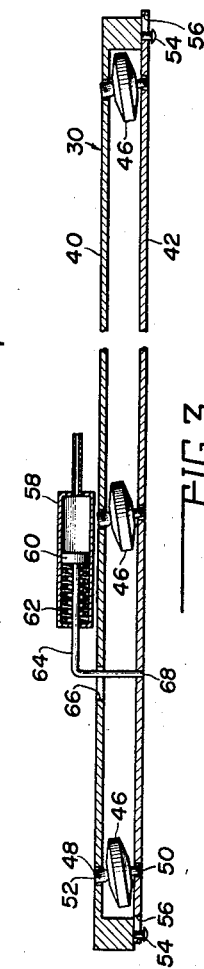
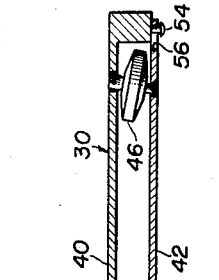
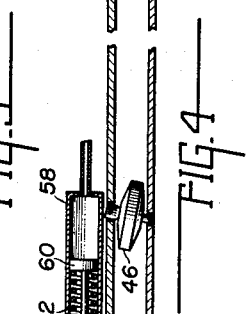
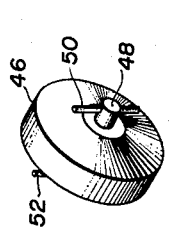
INVENTOR.
LEE F. McBRIDE
BY
Lockwood, Galt, Woodard, & Smith
ATTORNEYS

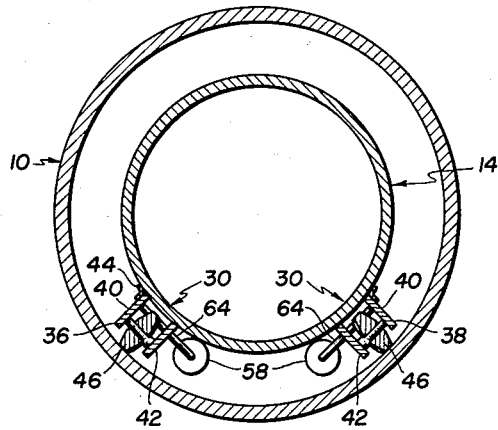

United States Patent Office 2,928,357
Patented Mar. 15, 1960

2,928,357

PIPE-TREATING APPARATUS

Lee F. McBride, Decatur, Ind., assignor to
Charles W. Fuelling, Fort Wayne, Ind.

Application November 14, 1955, Serial No. 546,515

6 Claims. (Cl. 104—138)

The present invention relates to pipe-treating apparatus, and more particularly to apparatus which may be transported unidirectionally through an underground pipeline while automatically maintaining itself in an upright position.

In Cook et al. application Ser. No. 473,402, entitled "Pipe Sealing Apparatus and Method," and filed Dec. 6, 1954, an apparatus and method are disclosed for treating locally the joints of an underground pipeline from the pipeline interior. In accomplishing this treating action, an apparatus of suitable design is moved through the pipeline from joint to joint, sequentially locating joints and coating them with a suitable plastic material.

The mechanism utilized for locating and coating the individual joints is somewhat complex in design as well as being rather heavy; therefore, it is necessary to provide a transporting carriage for said apparatus which will enable free movement through the pipeline for distances of the order of several hundred feet.

One difficulty encountered in the provision of a suitable transporting carriage is that the wheels of the carriage tend to climb up one side or the other of the pipeline wall, whereupon the apparatus falls over on its side and becomes wedged in the pipe.

In view of the foregoing, it is an object of this invention to provide pipe-treating apparatus which may be moved unidirectionally through an underground pipeline without overturning.

It is another object of this invention to provide carriage means for pipe-treating apparatus which is operable to automatically maintain the pipe-treating apparatus in upright position during transporting movement through the pipeline.

Still another object is to provide carriage means which serves in maintaining the pipe-treating apparatus properly centered in the pipeline.

Other objects of the invention will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

In the drawings:

Fig. 1 is a longitudinal view of one embodiment of this invention shown in operating position in an underground pipeline;

Fig. 2 is a side elevation of a portion of the carriage means illustrated in Fig. 1;

Figs. 3 and 4 are longitudinal sectional views taken substantially along section line 3—3 of Fig. 2 and showing the wheels thereof canted oppositely;

Fig. 5 is a perspective illustration of one wheel and kingpin arrangement; and

Fig. 6 is a cross-sectional view taken substantially along section line 6—6 of Fig. 1.

Referring to the drawings, and more particularly to Fig. 1, an underground main or pipeline 10 of relatively large dimension, such as 12 or 16 inches in diameter, is conventionally composed of a plurality of pipe sections joined together by bell and spigot joints 12. These joints are usually sealed by means of some suitable caulking compound; however, after a period of use, this compound deteriorates to to an extent that the pipeline will leak. This leakage is especially dangerous in the instance in which the pipeline 10 is used to convey combustible gases, so that it is incumbent that no leakage be allowed to occur and that all joints 12 be properly sealed.

The apparatus indicated generally by the reference numeral 14 is used to seal each joint 12, and certain of its details as well as the method of sealing the joints are disclosed and claimed in the aforementioned Cook et al. application Ser. No. 473,402. Inasmuch as this application relates to the subject matter of the aforementioned application, the disclosure of the aforementioned application is incorporated herein by reference insofar as it is necessary to achieve a clearer understanding of this invention.

Generally, the apparatus 14 comprises a storage tank 16 having a forwardly extending tubular frame 18 which carries on its distal end a set of rotary blades 20. The storage tank 16 contains a reciprocable piston (not shown) which forces plastic sealing material through the tube 18 and a nozzle 22 and thence onto the internal wall surface of the pipeline 10 adjacent the blades or paddles 20. A suitable air motor 24 is operable to rotate the paddles 20, thereby smearing or trowelling the discharged plastic material around the wall surface. The exact details of construction of this material-applying structure are illustrated and described in the aforementioned Cook et al. application.

A suitable joint-locating device 26 is mounted on the forward end of the cylinder 16 by means of a suitable bracket or the like 28 for providing an indication when the apparatus 14 is in registry with a joint 12. The details of construction of this joint-locating device 26 are disclosed in Cook application Ser. No. 394,003, filed November 24, 1953 and entitled "Pipe Joint-Locating Device and Method," the details of which are incorporated herein by reference.

A carriage, indicated generally by the reference numeral 30, is suitably secured to the apparatus 14 for transporting it to the pipeline 10.

Describing briefly the operation of that portion of the apparatus thus far described, the apparatus 14 is inserted in the underground pipeline 10 and by suitable cables or rods is forced unidirectionally through the pipeline for the desired distance, which may be in the order of several hundred feet. As the apparatus 14 is moved through the pipeline, the joint detector 26 will move into registry with a joint 12 as the latter is traversed, at which time the detector 26 produces an electrical signal which is conducted by means of suitable wires 32 to an electrical metering system 34 located at a remote point on the surface of the ground. An operator viewing the metering device 34 thereupon causes the apparatus 14 to be moved onwardly a distance which is sufficient for the blades 20 to fall into exact registry with the located joint 12. At this moment, the travel of the apparatus 14 is stopped and the motor 24 is actuated to cause rotation of the blades 20. Simultaneously therewith, the piston in cylinder 16 is forced forwardly for exuding material from the nozzle 22, whereupon the paddles 20 rub or trowel this discharged material into the cracks and crevices of the joint 12.

When this coating action is completed, the apparatus 14 is moved onwardly through the pipeline for the purpose of locating the next succeeding joint and then coating this joint as before.

Transporting movement of the apparatus is accomplished by means of the carriage 30, which is shown in further detail in Figs. 2 through 6. This carriage comprises two wheel-supporting frames 36 and 38 (see Fig. 6), these frames being substantially identical in construction whereby the description of one will suffice for both.

Each frame 36, 38 comprises a pair of parallel extending, spaced side bars 40 and 42, the side bar 40 being suitably affixed to the apparatus 14, while the bar 42 is movable with respect thereto. The bar 40 may be secured to the cylinder 16 by means of a bracket or the like 44 (see Fig. 6) whereas the bar 42 may slidingly bear against the cylinder 16, as will become apparent from the following. Other means of attaching the bars 40 and 42 to the apparatus 14 may be used without departing from the scope of this invention.

Between the bars 40 and 42 are mounted a series of wheels 46, each wheel being mounted on an axle 48 having kingpins 50 and 52 throughout opposite ends thereof. These kingpins are pivotally mounted in an upright position in the respective side bars 40 and 42 whereby movement of the side bar 42 relative to the bar 40 will cant the wheels 46.

The bar 42 is connected to the bar 40 by means of a pin 54 and slot 56 connection which permits relative longitudinal movement between the two bars, this relative movement serving to cant the wheels 46.

Canting movement of the wheels is achieved preferably through the use of a suitable motor 58 which in the drawings is illustrated as an air cylinder. The cylinder may be attached in any conventional manner to side bar 40, for example, and is provided with a reciprocable piston 60 which is urged toward the right by means of a spring 62 and which carries a drive rod 64. This drive rod 64 passes through a clearance opening 66 in the side bar 40 and is fastened at the end 68 to the side bar 42. Upon the introduction of air pressure of suitable magnitude, the piston 60 may be driven toward the left, as illustrated in Fig. 4, for canting the wheels 46, also as illustrated. Releasing this air pressure permits the spring 62 to move the piston 60 toward the right for canting the wheels 46 in the opposite direction, as illustrated in Fig. 3.

Preferably, the two air cylinders 58 are simultaneously controlled from the surface of the ground by means of air valves connected to suitably long air lines, operation of these valves serving to simultaneously operate the two air cylinders 58 (see Fig. 6) for canting the wheels 46 in opposite directions. The importance of this opposite canting will become apparent from the following.

Considering now the operation of the apparatus 14 of Fig. 1, assume that the apparatus is being pulled or pushed through the pipeline 10 in the leftward direction. For this direction of movement, the wheels 46 are canted oppositely outwardly as illustrated in Fig. 6 whereby the wheels of each set 36 and 38 tend to climb up the respective side of the pipeline. With the wheels so canted, the apparatus 14 will remain upright in the pipeline and will maintain its position substantially coaxial with that of the pipeline 10. During this leftward movement, air pressure is continuously applied to the cylinders 58, causing this outward canting movement of the wheels 46. However, if it is necessary to move the apparatus 14 in the opposite direction, the air to the cylinders 58 is cut off, thereby allowing the spring 62 to move the respective piston 60 oppositely, whereby the bar 42 is moved for canting the wheels oppositely. Thus, regardless of the direction of movement of the apparatus 14, the wheels 46 of the two sets 36 and 38 may be turned or canted outwardly, thereby insuring that the apparatus 14 will remain in an upright position.

By maintaining the apparatus 14 in an upright position, the blades 20 are automatically positioned coaxially inside the pipeline 10, whereupon operation thereof will serve to provide uniform rubbing action on the pipe wall. Also, by maintaining the apparatus 14 upright, the detector 26 is maintained in contact with the bottom of the pipeline 10 so that joints can be detected. If the apparatus 14 should climb up one side of the wall and turn over on its side, the detector 26 would fall away from the pipe wall and could not perform its joint-locating function. It is therefore necessary for the apparatus 14 to maintain its coaxial relationship inside the pipe 10 as well as to remain upright for both transporting movement and proper joint-locating action by the detector 26.

What is claimed is:

1. In a carriage means for transporting a material-applying means longitudinally within a pipeline, a carriage structure comprising wheels disposed on opposite sides of said structure, and means supporting said wheels on said structure in oppositely canted relation to the longitudinal axis of said structure.

2. In a carriage means for transporting a material-applying means longitudinally of a pipeline and coaxially therewith, a carriage having two sets of carriage-supporting roller members, the individual members of each set being oppositely canted, and motor means on the carriage for operating said roller members from one canted position to an oppositely canted position.

3. In a carriage means for transporting a material-applying means longitudinally of and within a pipeline, a carriage including as a part thereof supporting members engaging the interior of the pipeline at opposing angles relative to the longitudinal axis of the pipeline for exerting opposing forces on the carriage for preventing rotation of said carriage around the walls of the pipeline.

4. In a carriage for a material-applying device adapted to coaxially center said device in a pipeline, a carriage structure comprising a plurality of carriage-supporting wheels mounted on said structure for canting in a predetermined direction, said wheels being arranged on opposite sides of said structure, and mechanism operatively connected to said wheels for canting the wheels on one side oppositely to the wheels on the other side whereby said device will not turn over while being transported through a pipeline.

5. In a carriage for a material-applying device which is adapted to apply plastic material to localized internal areas of a pipeline, means adapted to coaxially center said device in a pipeline and comprising two sets of parallel extending spaced rails secured to said device and having a plurality of carriage-supporting wheels between each set of rails, said two sets being arranged on opposite side portions of said device, each set comprising one stationary bar and one movable bar, said wheels having kingpin connections with both bars whereby said movable bar may be operated to cant said wheels, and an operating mechanism connected to the movable bars of the two sets for canting the wheels of one set oppositely to the wheels of the other set.

6. In a carriage for a material-applying device which is adapted to apply plastic material to localized internal areas of a pipeline, means adapted to coaxially center said device in a pipeline, said means comprising two sets of parallel extending spaced rails secured to said device and having a plurality of carriage-supporting wheels between each set of rails, said two sets being arranged on opposite side portions of said device, each set comprising one stationary bar and one movable bar, said wheels having kingpin connections with both bars whereby said movable bar may be operated to cant said wheels, and motor means on said device having an operating connection with the movable bars of said two sets, said motor means and its operating connection serving to cant the wheels of each set of rails outwardly with respect to the direction of transport of said device.

References Cited in the file of this patent

UNITED STATES PATENTS

| | | |
|---|---|---|
| 1,061,035 | Batcheller | May 6, 1913 |
| 1,920,932 | Finley | Aug. 1, 1933 |
| 2,044,778 | Halstead | June 23, 1936 |
| 2,181,377 | Mabie | Nov. 28, 1939 |
| 2,518,330 | Jasper | Aug. 8, 1950 |
| 2,520,397 | Green | Aug. 29, 1950 |
| 2,539,360 | Bartlett | Jan. 23, 1951 |
| 2,604,521 | Boucher | July 22, 1952 |

FOREIGN PATENTS

| | | |
|---|---|---|
| 451,813 | Great Britain | Aug. 12, 1936 |